Aug. 17, 1926.
J. W. ESKHOLME ET AL
1,596,520
MILKING MACHINE
Filed Feb. 27, 1922 2 Sheets-Sheet 1
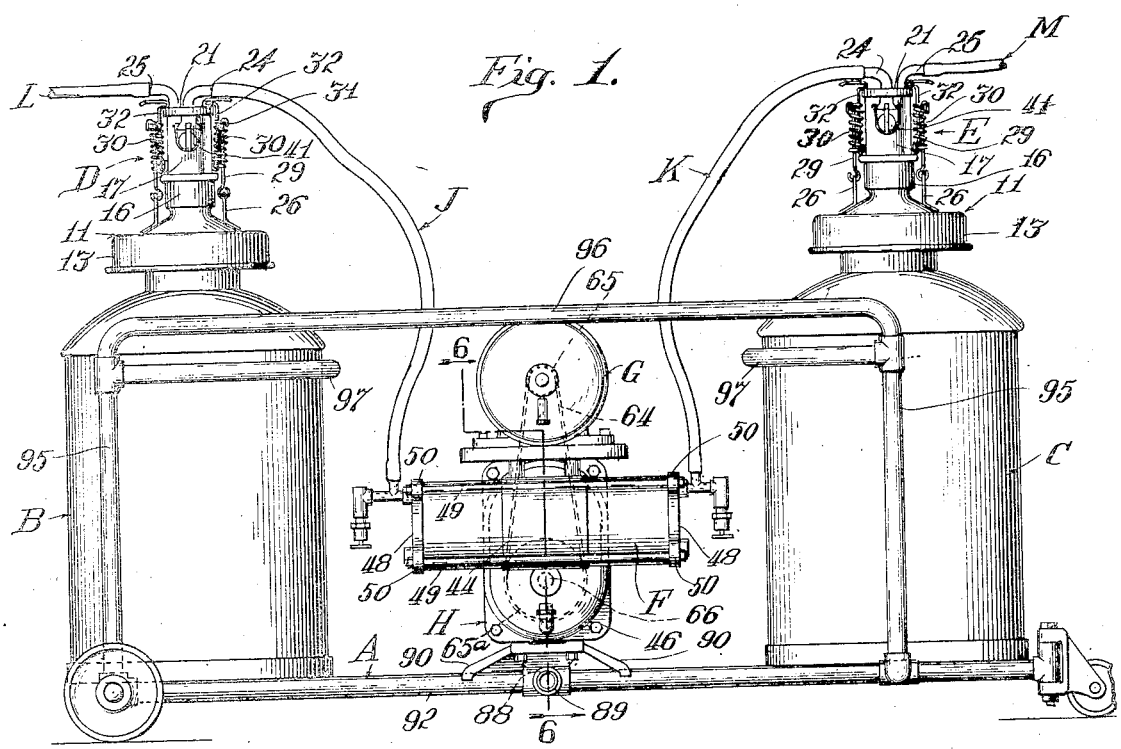
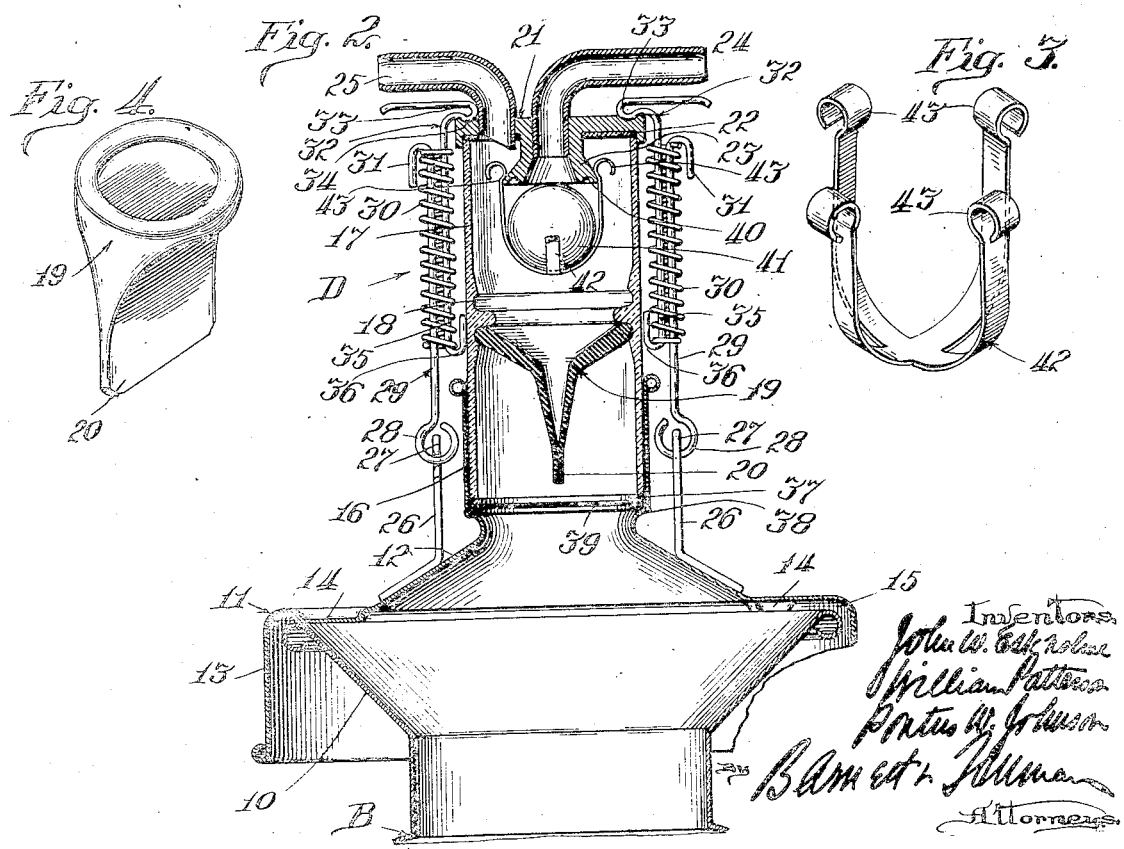

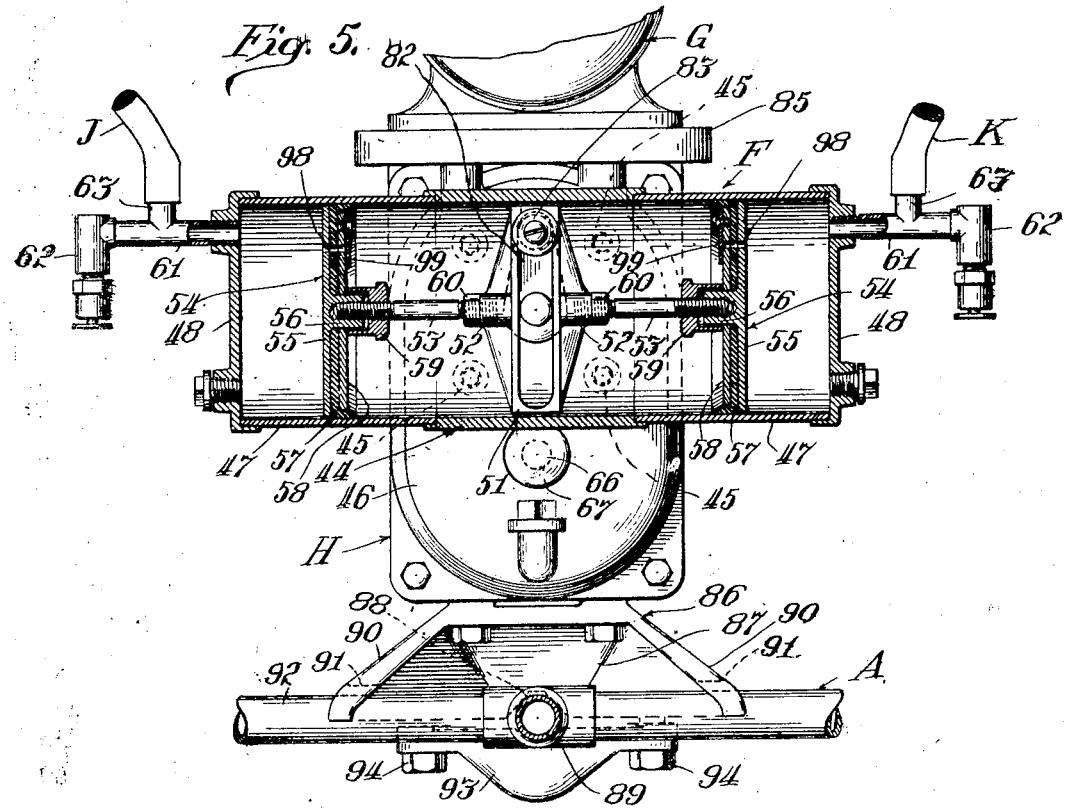
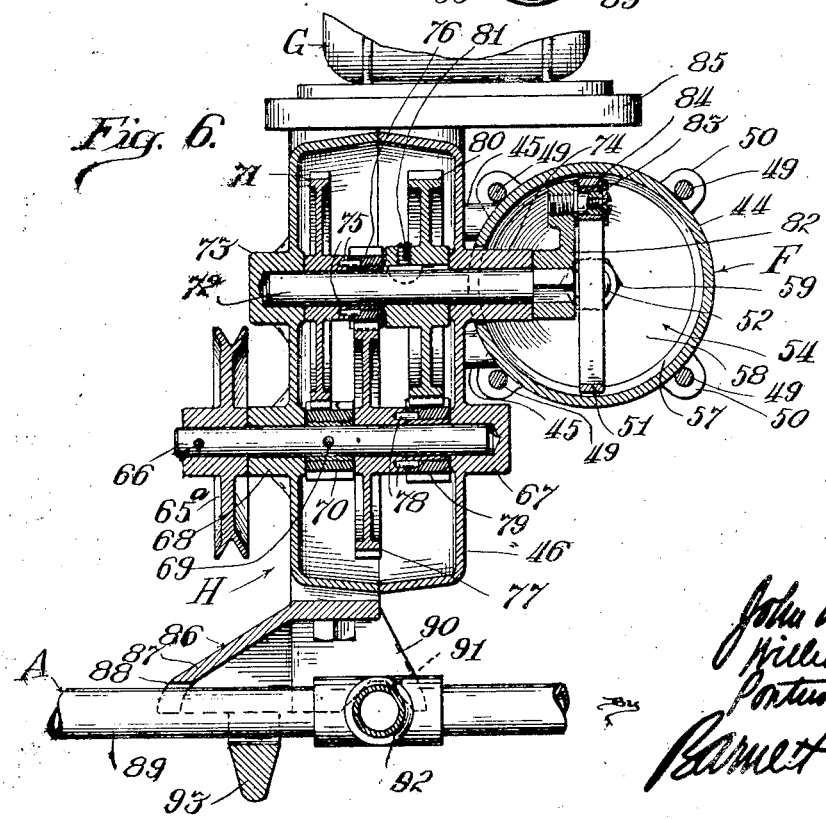

Patented Aug. 17, 1926.

1,596,520

UNITED STATES PATENT OFFICE.

JOHN W. ESKHOLME AND WILLIAM PATTERSON, OF CHICAGO, AND PONTUS W. JOHNSON, OF ARLINGTON HEIGHTS, ILLINOIS; SAID PATTERSON ASSIGNOR TO BURTON-PAGE COMPANY, A CORPORATION OF DELAWARE.

MILKING MACHINE.

Application filed February 27, 1922. Serial No. 539,630.

This invention relates to a milking machine of the type comprising an exhausting pump adapted to create a vacuum intermittently in a teat cup cluster or equivalent device applied to the cow's udder, and a chamber adapted to receive the milk as drawn from the cow and to discharge the same, between suction impulses, into a receptacle under atmospheric pressure.

Among the objects of my invention are: To provide a novel and improved form of milk receiving chamber including an improved valve closed by suction and opened when the vacuum in the chamber disappears for effecting the discharge of the milk from the chamber; to provide improved means for mounting the milk chamber on a milk can or other receptacle adapted to receive it when discharged from the chamber; to provide novel means for preventing the milk from being drawn into the pump from the milk chamber; and, generally speaking, to provide a milking machine which will be simple to operate, which can be readily taken apart for cleaning purposes so that the machine is sanitary, and which may be manufactured at a relatively low cost.

The invention consists in the new and improved devices, arrangements and constructions, to be hereinafter described and claimed, for carrying out the above stated objects and such other incidental objects as will be referred to in the following description of the preferred embodiment of the invention shown in the annexed drawings.

In the drawings,

Fig. 1 is a side elevation of a motor driven milking machine, constructed, in accordance with my invention, so that two cows may be milked by the machine simultaneously.

Fig. 2 is a fragmentary, vertical, sectional view of one of the milk receiving chambers and associated parts.

Fig. 3 is a view, in perspective, of a cage for supporting the float valve associated with the air outlet of the chamber.

Fig. 4 is a view, in perspective, of the valve or closure device associated with and forming part of the milk receiving chamber.

Fig. 5 is a view, in elevation, with parts in section, of the pump and mechanism for driving the same, and Fig. 6 is a sectional view on line 6—6 of Fig. 1, the scale being enlarged.

Referring to the drawings, we have shown our invention as embodied in the motor driven, two unit milking machine, that is to say, a machine adapted for milking two cows simultaneously, in which the pump is driven by a motor. It should be stated, however, that the milk chamber as herein disclosed might be used in a machine operated by hand and in machines having a single milk chamber or more than two milk chambers.

In the apparatus shown in the drawings, A represents a supporting framework, B and C a pair of milk cans (any suitable receptacle might be used), D and E milk receiving chambers mounted upon the milk cans B and C, respectively, F a double acting reciprocating pump, G a motor (electric motor being indicated) for driving the pump, and H a speed reducing transmission gear set interposed between the motor and pump. J and K designate air pipes or tubes leading from opposite ends of the pump F to the milk receiving chambers D and E, respectively, and L and M milk pipes or tubes leading from the teat cup clusters, or other udder attachments (not shown) to said milk chambers D and E, respectively.

In describing the apparatus reference will be made particularly to the milking unit comprising chamber D, milk can B, pipes L and J, together with the pump and its operating mechanisms, and no detailed description given of the unit on the other side of the machine consisting of the milk can C, milk chamber E and pipes K and M, since the units are of identical construction.

The milk can B is shown as formed with the usual flared mouth or rim 10. On this rim is arranged a cover 11 having a conical portion 12 and a down turned flange 13, the cover being formed with a plurality of offsets 14 which raise the body of the cover above the upper edge of the milk can so as to provide a ventilating opening 15. By this arrangement dirt and dust are prevented from entering the milk can, during the milking operation, and at the same time the heat in the milk is dissipated so as to minimize the propagation of bacteria. Cover 12 is formed with an upstanding cylindrical portion 16 in which is seated a cylinder 17 preferably made of glass and formed with a seat for the closure member 19, said seat being here shown as a unitary circumferential groove 18. In this groove is seated the upper edge of the funnel-shaped valve or closure member 19 which is made of rubber or other suitable flexible material. The lower portion of this member is preferably flat as indicated at 20 in Figs. 2 and 4. The lower portion of said member is preferably thinner, and consequently more resilient than the upper portion. This funnel-shaped member, with its flattened, tubular spout 20, provides a port for discharge of milk from the milk chamber, which port, however is closed as soon as a vacuum is created in the chamber. The creation of a vacuum in the chamber causes the collapse upwardly of member 19, preventing the entrance of air into the chamber through the discharge port. At the same time the deformation of member 19 under a vacuum expands the rim portion of the member, forcing it closely into the circumferential groove 18 in which it is seated. This construction, therefore, provides an effective valve which is so engaged with the chamber that it may be very easily removed for cleaning and replaced in the chamber. In order that the cylinder 17 should be reversible it is preferably formed with two grooves 18. The top of the milk chamber consists of a metal head 21 between which and the cylinder is interposed a gasket 22. The head is formed with a central opening around which is a flared, depending flange 23. 24 is a nipple for the air pipe J. 25 is a nipple which extends through the head at one side thereof for the milk pipe L connecting the chamber with the teat cup cluster. In order to hold the parts of the milk chamber together and in place on the milk can cover 12, we provide a pair of resilient attaching devices which are connected with the cover and detachably engaged with the head 21. Each of these devices is preferably constructed as follows: 26 is a strap attached to the cover 12 and formed at its upper end with an eyelet 27 to receive the eyelet 28 on a link 29 which extends through a coiled spring 30 with its upper end 31 in the form of a hook engaging the upper turn of the spring. 32 is a clip member formed with a loop 33 engaging a recess 34 on the head 21 and formed with a shank 35 extending through spring 30 and provided at its lower end with a hook 36 engaging the lower turn of the spring. When the clip is engaged with head 21 spring 30 is under compression. Preferably a gasket 37 is interposed between the lower end of cylinder 17 and a shoulder 38 on the cover. This gasket forms part, preferably, of a strainer 39. By the arrangements just described the parts of the milk chamber are held in air-tight relation with each other and with the cover by devices which permit the ready removal of the milk chamber parts for cleaning.

In order to prevent the drawing of the milk into the air line, the following arrangements are preferably employed:

In the first place, the air outlet member 23 is flared as shown so that the milk in entering the chamber through nipple 25 is deflected from the air outlet.

In the second place, the lower edge of member 23 is formed with a circumferential groove 40 which tends to prevent milk dripping on the outer surface of member 23 from following around the edge of said member into the air current therethrough.

In the third place, a float valve 41 is arranged under the air outlet, this valve being supported in a cage (Fig. 3) consisting preferably of four spring legs 42, the upper ends of which are formed with bends 43 adapted to engage the member 23. The cage and ball valve may, therefore, be readily removed when the parts of the milk chamber are cleaned.

The pump F comprises a cylinder consisting of a central cylinder section 44 formed with lugs 45 adapted to be attached to the casing 46 of the gear set H, two end sections 47, 47, and heads 48, 48, these parts being held together by bolts 49 extending through lugs 50 on the heads. Within the cylinder is a cross head 51 formed with bosses 52, 52 into which are screwed the stems 53 of a pair of pistons 54, 54. The latter comprise, in each case, a disc 55 formed with a boss 56 for the outer end of stem 53, a leather 57 and a disc 58 which is pressed against the leather by a nut 59 on the stem. A lock nut 60 is provided for the end of the stem engaging cross head 51.

Connected with each cylinder head 48 is a short T pipe 61 on the end of which is arranged a relief valve 62 which may be set to open at any desired vacuum. Pipe J is attached to the branch 63 of T 61.

We have shown an electric motor G for driving the pump through the intermediation of the reducing gear set H. Any other suitable type of motor could be employed. 64 is a belt extending around a pulley 65 on the driven shaft of the motor and around a pulley 65ª fixed to a shaft 66 extending through the gear case 46 and journaled in bosses 67, 68 formed thereon. Secured to shaft 66 by a key pin 69 is a gear wheel 70 of small diameter which meshes with a larger gear wheel 71 rotating upon a shaft 72 journaled in bosses 73, 74 formed on the casing 46, the boss 74 extending through an opening in the side of the pump cylinder section 44. Gear wheel 71 is connected by key pins 75 with a small gear wheel 76 loose on shaft 72. Gear 76 meshes with a large gear wheel 77 loose on shaft 66 and connected by pins 78 with a small gear 79 revoluble on shaft 66. Gear 79 is in mesh with a large gear wheel 80 which is keyed at 81 to shaft 72. By this arrangement the speed of rotation of shaft 72 is very much less than the speed of rotation of the driven shaft of the motor. As a matter of fact we contemplate a reduction from 1750 revolutions per minute in the motor to 40 revolutions per minute of shaft 72. This ratio may, of course, be varied by appropriate changes in the diameters of the gear wheels.

Fixed to the end of shaft 72 projecting into the pump cylinder is a crank 82 having a wrist pin 83 which extends revolubly through a bushing 84 set into the cross head 51.

The motor G is arranged on a shelf 85 secured to the top of casing 46. The casing itself is supported on a bracket 86 formed with a leg 87 having a notched portion 88 fitting over a cross member 89 of frame A, the bracket being provided with a pair of legs 90 notched at 91 to engage one of the longitudinal members 92 of the frame work A, on opposite sides of the cross member 89. 93 is a clamping member arranged under the frame secured by screws 94 to the bracket member 86. This arrangement provides a firm and reliable mounting for the pump and its operating mechanisms which permits the ready disassembly of these parts when occasion requires it. The frame A comprises uprights 95, upper cross rails 96, on opposite sides, one being shown, and a pair of curved members 97 secured to the uprights 95 and adapted to extend partly around the milk cans B to keep them in place.

In order to prevent the milk from being forced from the milk chamber with too great pressure, the pistons of the pump are preferably formed with relief ports 98 covered on the inside by flap valves 99.

*Operation.*—Assuming that the machine is used for milking two cows simultaneously, the udder attachments (not shown) on the ends of milk pipes L and M are put in place on the cow's udders and the motor G started. The motor operates through the reducing gear set H and crank 82 and cross head 51 to impart reciprocating movements at relatively slow speed to the pistons 54. On the movement to the right (Fig. 5) of the pistons, the air is exhausted from the milk chamber D of the device on the can B, the funnel-shaped closure or valve element 19 collapsing upwardly so as to close the opening through this element and to force its rim portion closely against the inner surface of the cylinder 17. Milk is drawn from the cow through pipe L and passes into the chamber through nipple 25, being deflected away from the air outlet member 23 by the flared or conical shape of the latter member, groove 17 preventing any milk that may drip down the outside of member 23 from working around into the air current. In case the milk should rise too high in the receiving chamber float valve 41 is lifted so as to close the air outlet. When the pistons 54 are moved in the opposite direction, that is to say, to the left, Fig. 5, milk is drawn into chamber E of the device of the can C, in a similar manner, through pipe M and the pressure reestablished in milk chamber D. The reestablishment of pressure in chamber D causes closure element 19 to re-assume its normal position allowing the milk to be discharged into the milk can B through strainer 39. The arrangement of the cover 12 of the milk can so that a ventilation space 15 is provided between the cover and the top of the can allows vapors to escape and tends to cool the milk so as to minimize bacterial propagation. By lifting clip members 32 the parts constituting the milk chamber may be quickly removed from the cover 12 for cleaning. The heads 48, 48 of the pump cylinder are preferably unitary with cylinder sections 47, 47, respectively. To clear the pump, the heads and cylinder sections 47, 47 are removed by taking out bolts 49. The replacement of these parts can be easily made without disturbing the leathers of the pistons.

It is realized that while the invention has been described in what we regard as the preferred embodiment, modification of constructional details and omission of some features considered as desirable might be made without departure from the principles of the invention. Therefore we wish it to be understood that the invention should not be considered as limited to the particular constructions, devices and combinations shown, except to the extent that the appended claims are specifically so limited.

We claim:

1. In combination with the exhausting apparatus and milk conduit of a milking machine, a rigid milk receiving chamber provided with an internal annular seat, and a flexible closure element removably arranged in the chamber to engage the seat and provided with a milk discharge port, which element is adapted to collapse to close said port and to be pressed against the inner wall of the chamber when a vacuum is created in said chamber.

2. The combination with the exhausting apparatus and milk conduit of a milking machine, of a rigid milk receiving chamber provided with an internal annular seat, and a flexible funnel-shaped element, the rim of which removably engages the seat in said chamber and which is flexible so that the port therethrough is closed and the rim pressed against said wall when a vacuum is created in said chamber.

3. The combination with the exhausting apparatus and milk conduit of a milking machine, of a rigid milk receiving chamber formed with an internal circular groove, and a flexible funnel-shaped element in said chamber, the upper edge of which seats removably in said groove and which is adapted to collapse under vacuum to close the port therethrough.

4. In combination with the exhausting apparatus and milk conduit of a milking machine, a rigid milk receiving chamber formed with an internal circular groove, and a flexible funnel-shaped element in said chamber, the upper edge of which seats in said groove and the lower part being flat, and which is adapted to collapse under vacuum to close the port therethrough.

5. In combination with the exhausting apparatus and milk conduit of a milking machine, a rigid cylindrical milk receiving chamber formed internally, and midway of the length thereof with a pair of symmetrically arranged annular grooves, and a flexible funnel-shaped closure in said chamber, the upper edge of which seats in one of said grooves, and the lower end of which is adapted to collapse under vacuum to close the port therethrough.

6. In combination with the exhausting apparatus and milk conduit of a milking machine, a milk receptacle comprising a cylinder formed with an internal circumferential groove, a head provided with milk and air pipes, and a flexible, funnel-shaped element providing a port for the discharge of milk, a portion of the element being seated in said groove.

7. In a milking machine, the combination of a milk can cover, a milk receptacle comprising a cylinder removably mounted on the cover, a head closing the cylinder, and a plurality of spring devices connected with the cover and adapted to engage the head.

8. In a milking machine, the combination of a milk receiving chamber, a support for the same, and means for removably holding the chamber on said support comprising a plurality of links pivoted to the support, clips to engage the top of the chamber, and coiled springs engaged by said links and clips, so as to be put under compression when the clips are engaged with said chamber.

9. In a milking machine, a milk can cover, a milk chamber comprising a cylinder mounted on the cover, a head for the cylinder provided with air and milk pipes, a collapsible, funnel-shaped element in the cylinder providing a milk discharge port, and a pair of resilient engaging devices attached to said cover and adapted to engage the head to hold the parts of the chamber together and in place on the cover.

10. In a milking machine, a milk chamber having a head formed with a milk inlet and an air outlet, a float valve adapted to close the outlet, and a cage for said float valve provided with resilient members for detachably engaging said cage with the head.

11. In a milking machine, a milk chamber having a head formed with a milk inlet and an inwardly projecting flared air outlet member, a float valve adapted to close said air outlet, and a cage for said valve provided with resilient members for detachably engaging the cage with said flared outlet member.

12. In a milking machine, a milk chamber having a head formed with a milk inlet and an inwardly projecting air outlet member adjacent thereto, the lower edge of which is formed with a circumferential groove, for the purpose described.

JOHN W. ESKHOLME.
WILLIAM PATTERSON.
PONTUS W. JOHNSON.